Patented Apr. 20, 1948

2,439,951

UNITED STATES PATENT OFFICE 2,439,951

ALTERNATING CURRENT GENERATOR FED MOTOR CONTROL SYSTEM

Walter Schaelchlin, Pittsburgh, Pa., and Herman H. Curry, Morristown, N. J.; said Schaelchlin assignor to Westinghouse Electric Corporation, East Pittsburgh, Pa., a corporation of Pennsylvania Application April 21, 1945, Serial No. 589,632

4 Claims. (Cl. 318—148)

Our invention relates to electric control systems and more particularly to electric systems of control for the propulsion of ships using synchronous motors for operating the propellers.

In the art of ship propulsion the control of the engine room equipment in relation to the commands from the pilot house involves a complicated system of speaking tubes, telephones, telegraph systems, or other means of communication always requiring the attention of two or more men.

One broad object of our invention is to control the propulsion equipment of a ship directly from the pilot house.

Another broad object of our invention is the provision of simple follow-up mechanisms to effect the operation of the propulsion equipment directly from the pilot house.

A more specific object of our invention is the provision of selective control means to selectively automatically control the propulsion of a ship either from the pilot house or the engine room, or manually control the propulsion of a ship from the engine room.

The few broad objects recited are merely illustrative. Many other objects and advantages will become more apparent from a study of the following specification and the accompanying drawings, in which:

Figure 1A:
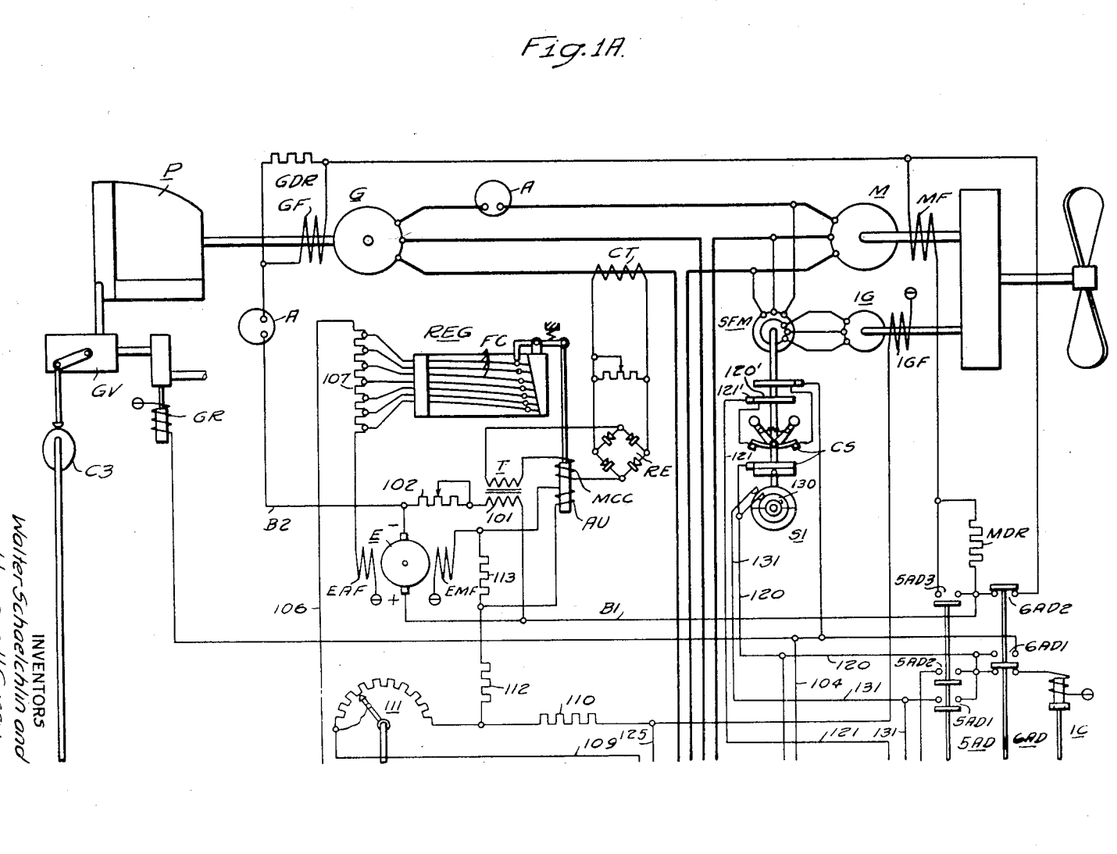
Figures 1A and 1B are a diagrammatic showing of one embodiment of our invention.

In Fig. 1A, P represents the prime mover or turbine for driving the main generator G. The propulsion motor M is mechanically coupled to drive the ship propeller and may be connected for ahead or astern operation respectively through contact segments D1 and D2, or D3 and D4 on the controller drum D.

This controller drum may be operated either manually from a handwheel HW in the engine room, automatically through the operation of a knob or handle on the follow-up lever FL of the transmitter disposed in the engine room, or operated completely automatically from a lever PHL in the pilot house.

The lever PHL in the pilot house is, as shown, mechanically coupled to the rotor element of a receiver motor in the pilot house and is designated the pilot house synchrotie, PHS. This receiver motor is electrically connected to a transmitter motor in the engine room and is designated the engine room synchrotie ERS. The transmitter motor operates the movable follow-up lever FL of a follow-up device FU having coacting contact segments geared to the drum D.

For automatic operation the drum is operated in a definite sequence by means of a pilot motor PM. The operation of this pilot motor is controlled through the follow-up device FU and the selector switch SS. The selector switch has four positions: Off, Engine room automatic, Engine room manual, and Pilot house.

The propulsion motor is a synchronous motor and to effect proper synchronization the drum, in its operation, and a group of electromagnetic devices, commutating switches and centrifugal switches provide for automatic synchronization at maximum pull-in torque, automatic stability control, and by means of a combination of speed responsive and time limit devices manual synchronization may be effected should part of the equipment have failed, as may happen under battle conditions.

A better understanding may probably be had of our contribution to the art from a study of the operating sequence for each of several operating conditions.

Figure 1B:
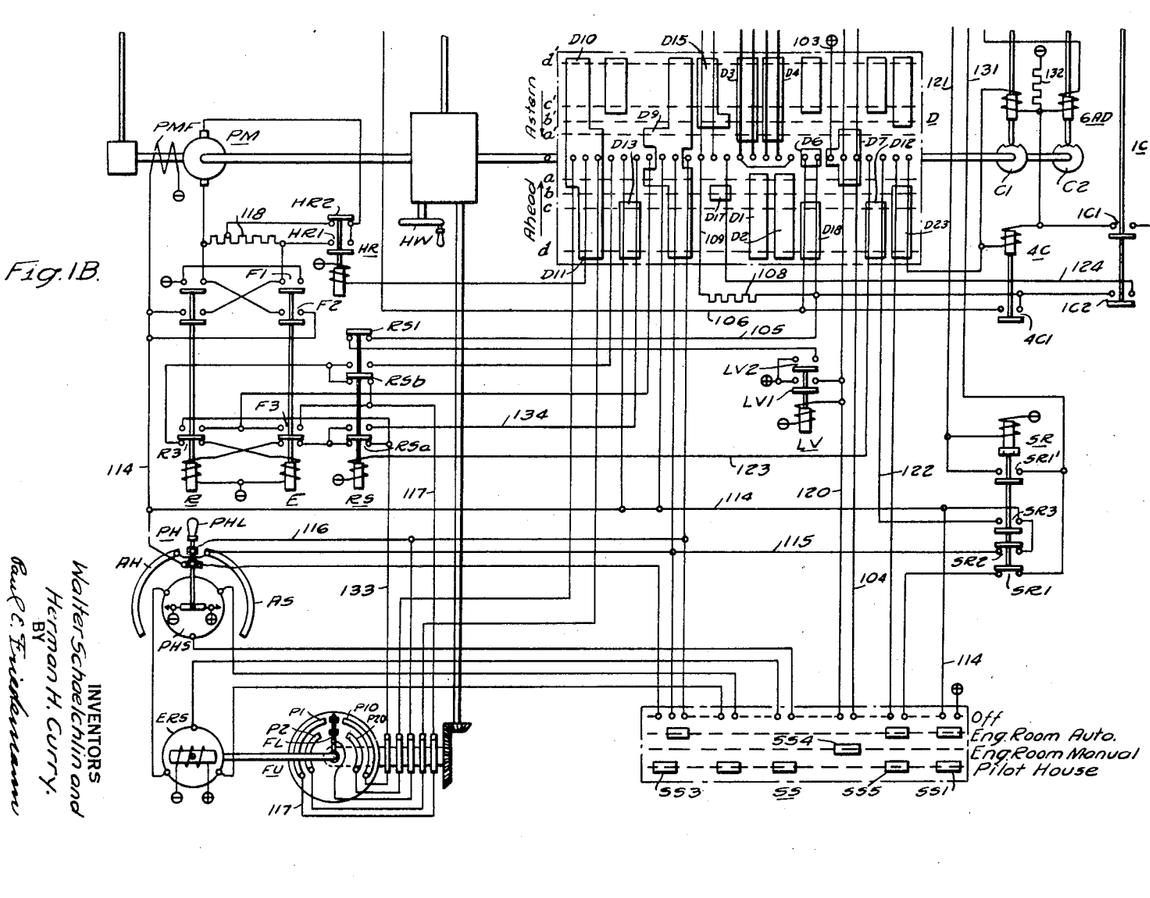

Assuming that the direct-current exciter E is operating at full speed and that the prime mover or turbine P is operating and that all such switches or circuit breakers not part of this invention are closed to provide energization of the various terminals designated by positive and negative terminals, then one circuit is established from the positive terminal of the exciter E through bus B1, through back contacts 6AD2 of the automatic-drum control contactor 6AD, through the generator field GF and the generator field discharge resistor GDR connected in parallel, to bus B2 and thence to the negative terminal of the exciter. Another circuit is established from bus B1 through one winding 101 of the regulating damping transformer T, the rheostat 102 to the bus B2.

Another circuit is established from the positive terminal 103 through the reset switch of the drum controller D, segment D7, conductor 104, and the coil of the governor relay GR to the negative terminals. The governor relay controls the admission of steam to the turbine so that the generator G operates at from 40% to 60% of full speed depending on the governor adjustment so that such auxiliary equipment as is being supplied by the generator may be operated regardless of whether the ship is in operation or not.

Another circuit is established from positive terminal 103, through segment D7 and the actuating coil of the low-voltage relay LV to the negative terminal. Operation of the low-voltage relay closes the contacts LV1 whereupon a circuit is established from the adjacent positive terminal through contacts LV1 through the coil of the LV relay. This relay thus directly energizing conductor 120 remains energized regardless of the position of drum D and drops out only on low-voltage or voltage failure. A circuit is also established from conductor 120 through the back contacts 6AD1 through the actuating coil of control relay 1C to the negative terminal. This relay 1C sets up a circuit useful during a later stage of operation.

The low-voltage relay also closes contacts LV2 to thus establish a circuit from the positive terminal shown adjacent the low-voltage relay, contacts LV2, back contacts RS1 of the resynchronizing relay RS, conductor 105, drum controller switch D6, conductor 106, resistor 107 of the "Silverstat" regulator REG and the exciter auxiliary field EAF to the negative terminal. Since the "Silverstat" controls the excitation of field EAF as a function of the load on generator G as pointed out hereinafter and since the generator G is not loaded, except for such auxiliaries as are connected to it, the value of excitation for field EAF is at this stage of operation relatively low.

Another circuit is established from energized conductor 105 through resistor 108, conductor 109, rheostat 111, resistors 112 and 113, and the exciter main field EMF to the negative terminal. The exciter is thus operated at some selected voltage. It will be noted that the resistor 110 and the field 1GF of the synchronizing, or pilot, generator 1G are connected in parallel to resistors 112 and 113 and the field EMF to thus be fully energized when generator 1G is called upon to aid in the control functions.

If the intention is to use automatic pilot house control, then the selector switch SS is shifted so that the lowermost segments bridge the associated contact fingers. As soon as the selector switch is thus operated, a circuit is established from the positive terminal through segment SS1, conductor 114 and pilot motor field PMF to the negative terminal. The pilot motor is thus fully energized and ready to operate the drum D when the pilot house control PH is operated.

Another circuit is established from conductor 114 through contacts SR2 of the synchronizing relay SR, conductor 115, and contacts SS3 to the contacts on the pilot house control lever PHL. The segments AH and AS are also energized upon energization of the conductor 115.

The pilot house synchrotie PHS and the engine room synchrotie ERS are energized with direct-current as shown.

If the object is to start the propulsion control to obtain full speed ahead and the attendant does not wish to interfere with the automatic sequence then he throws the lever of the pilot house control PH to its full counter-clockwise position. The engine room synchronizing unit ERS thus operates the follow-up lever FL of the follow-up device FU in the counter-clockwise direction over its entire range.

This lever PHL when first moved, connects the upper finger on this lever to the positively energized segment AH. Segments AH and AS are positively energized because they are directly connected to positively energized conductor 115. As the upper finger on lever PHL becomes positively energized, a circuit is established from this finger through the conductor 116, follow-up lever FL, segment P1', conductor 117, back contacts RS*b* of the resynchronizing relay RS, back contacts R3 of the reverse directional contactor R, and the actuating coil of the forward directional contactor F to the negative terminal.

The coil of the high-speed relay HR is also energized, the circuit being completed from the lever FL through segment P2, drum contact D11 of the drum controller through the coil of relay HR to the negative terminal.

Operation of the high-speed relay HR and directional contactor F, which for the operation of lever PHL assumed is substantially simultaneously, establishes a circuit from the positively energized conductor 114 through contacts F2 of contactor F, the pilot motor armature, front contacts HR1 of relay HR, and contacts F1 to the negative terminal.

Since the coil for the high speed relay HR is energized through segment P2, it is apparent that for any slow operation of lever PHL or any deliberate arrested operation of lever PHL after movement through a relatively small angle will cause segment P1 only to be engaged by lever FL. This means that the directional contactor F will be energized but relay HR will not become energized. Under these conditions, the armature circuit for the pilot motor PM is completed through back contacts HR2, resistor 118, and contacts F1 to the negative terminal. Since the resistor 118 is in the pilot motor armature circuit, the pilot motor will operate at a desired slow speed.

For the operation of lever PHL first assumed, the pilot motor speed will be relatively high, thus moving the drum D at relatively high speed, from the "off" position shown, in the direction designated by the arrow adjacent the lower left of the drum D, so that the drum will pass successively through position *a*, *b*, *c* and *d* in the order named.

Movement of the drum from the "off" position to the first or *a* position opens the reset switch D7 on the drum so that the low voltage relay LV is energized through its own holding circuit only and this relay assumes its control function independent of the position of the drum. Drum switch D6 opens to thus open the circuit for the auxiliary field EAF of exciter E, and drum switch D7 opens the direct connection to conductor 104.

Operation of the drum controller to the first or *a* position closes the drum switches D1 and D2 to thus connect the motor M to the generator. The motor M thus begins to operate as an induction motor.

Closure of switches D1 and D2 also connects the slip frequency motor SFM to the generator. This motor SFM is a wound rotor type induction motor having its stator windings energized directly from the generator G, but its secondary windings are connected to the output terminals of the small pilot generator 1G. This pilot generator is geared to the propeller shaft and thus generates an alternating current having a frequency proportional to the ship propeller. This means that motor SFM will, a moment after the closure of switches D1 and D2, operate at substantially synchronous speed but as motor M speeds up the frequency of pilot generator 1G rises. This means that the actual speed of motor SFM will be proportional to the slip speed of motor M.

Since the speed of motor SFM is going to be high for all high slip speeds, the centrifugal switch contacts CS coupled to this motor will be closed immediately on starting of motor M and will remain closed until the slip speed drops to a selected value.

Closure of the contacts of centrifugal switch CS establishes a circuit from the energized conductor 120 through the contacts of CS, slip ring 120' and brush 121', conductor 121, and the actuating coil of the synchronizing relay SR to the negative terminal. An energizing circuit is also retained from the conductor 120 through the back contacts 6AD1 of 6AD through the coil of control relay 1C to negative terminal.

Both the relays 1C and SR are of the time delay type and upon deenergization require a definite time interval for operation of the contacts operated by these respective relays.

Operation of control relay 1C, which operation is of course effected when the controller drum is in the off position to thus energize conductor 120, merely sets up circuits to be later used.

Operation of the synchronizing relay SR opens the back contacts SR2 and the back contacts SR1 and closes the make contacts SR3 and the make contacts SR1'. It will also be noted that contacts D7 of the drum controller are still closed and remain closed so long as the drum D has not moved to its third or so-called "start," or b, position.

When the drum D is moved to the second, or a position, drum segment D9 closes, whereupon a holding circuit is established for the coil of the forward directional contactor F. The circuit for this coil may be traced from energized conductor 114 through segment D9, the make contact F3 of the directional contactor F, the contacts RSb of the resynchronizing relay RS, back contacts R3 of the reverse directional contactor R, and the coil of the forward directional contactor F.

Contacts D11 open just prior to the movement of the drum to the third, or b, drum position so that the coil of the high speed relay HR is deenergized to thus effect slow-down operation of the pilot motor PM to prevent hunting just prior to the deenergization of the pilot motor.

As soon as the drum has moved to the third namely, the b, or "start" position, the drum segment D9 opens to thus deenergize the forward directional contactor to thus disconnect the pilot motor armature from the source of supply with the result that the drum D is stopped in the third position.

Another circuit is established from the positive terminal through contacts LV2 of the low voltage relay LV, back contacts RS1 of the resynchronizing relay, front contacts 1C2 of the control relay 1C, conductor 124, contacts D17 of the drum controller, conductor 125, resistors 110, 112, and 113, and the main field EMF of the exciter E to the negative terminal. This circuit just traced shunts out the rheostat 111 and thus considerably overexcites the exciter so that the generator field GF is provided with over-excitation to facilitate synchronization of the motor M.

The synchronous motor M continues to accelerate as an induction motor. As soon as the slip has decreased to about six percent, the contacts CS of the centrifugal switch open to thus open the direct circuit for the energizing coil of the synchronizing relay SR. The coil for the synchronizing relay is, however, still energized through its holding circuit including the commutating disc of the synchronizer S1. The circuit for the synchronizing relay SR may be traced from the positive terminal through contact LV1, conductor 120, the commutating disc 130 of synchronizer S1, conductor 131, the make contacts SR1', and the coil of relay SR to the negative terminal.

When the centrifugal switch CS opens, the energizing circuit for the governor relay GV is opened at the contacts of CS with the result that the steam admission is suddenly decreased so that the generator G slows down. The frequency thus drops just at a time when the slip frequency is decreasing from about six percent to some still lower value. The generator speed is thus caused to fall back at the most opportune time when the motor M is approaching synchronous speed.

The commutating disc 130 consists of a conducting semicircular section and a non-conducting semicircular section. Since the slip frequency is low, being at six percent and is still at this stage decreasing, it is apparent that the synchronizing relay SR is energized intermittently.

The relay SR is of the inductive time delay type having a definite time constant. As the motor continues to accelerate, the periods of deenergization become longer and longer as the percent slip becomes less. At about three percent slip, or some other selected percent slip, the synchronizing relay SR drops out.

The conducting and non-conducting sections of discs 130 are positioned on the shaft of the slip frequency motor SFM so that the relay SR drops out when the pole pieces of motor M have some definite relation to the rotating flux in the stator of motor M.

When the relay SR drops out, the back contacts SR1 close and the contacts SR2 close. An instant later the commutating segments are again in conducting relation but relay SR, having broken its holding circuit, does not again pick up, but now an energizing circuit is established from re-energized conductor 131, through the back contacs SR1, contacts SS5 of the control selector switch SS, contacts D23 of the drum controller, the coil of control relay 5AD and contacts 1C1 to the negative terminal.

The coil of relay 4C being connected in parallel to the coil for relay 5AD is also energized. This relay 4C closes its contacts 4C1 to establish a circuit from the positive terminal through the contacts LV2 of the low voltage relay, contacts RS1, contacts 4C1, the resistor sections 107 of the regulator REG and the auxiliary exciter field EAF to the negative terminal.

Since the motor M is, during acceleration, as an induction motor drawing a rather heavy load current, the current transformer CT will furnish a rather heavy current to the rectified RE. The output current of the rectifier will thus be rather heavy so that a relatively large current flows in the main control coil MCC for the actuating armature for the regulator. The armature will thus move up, thus effecting the shunting of most or very likely all the resistor sections 107 of the regulator. The field EAF will thus be energized at a maximum value with the result that the exciter voltage will be at its peak value. The generator voltage will thus be at its very highest at a time when synchronization is to take place. This high generator voltage is further timed to take place at a time when the slip is decreasing to a very low value and at a time when the generator frequency is decreasing.

Operation of relay 5AD causes the closing of its contacts 5AD1, 5AD2, and 5AD3. Closure of contacts 5AD3 shunts the motor field discharge resistor MDR thus connecting the motor field MF to the exciter E. The motor field is, however, not yet being excited since the contacts 6AD2 directly shunting the motor field are still closed.

The closure of contacts 5AD1 and 5AD2 sets up a circuit for the coil of control relay 6AD. The very first time, after the SR relay dropped out, that the discs 130 are again in conducting relation, a circuit is established from the energized conductor 120 through the discs 130, conductor 131, contacts 5AD1 and 5AD2, the actuating coil of control relay 6AD, and contacts 1C1 to the negative terminal.

Operation of relay 6AD first causes the opening of contacts 6AD2. The timing of the successive operations of the relay SR, relay 5AD, discs 130, and contacts 6AD2 is such that the shunt circuit for the motor field is opened when the pole pieces hold just such position with reference to the rotating flux that maximum pull-in torque is obtained. Further, as already pointed out, the exciter is very much overexcited so that there is no danger of a failure to synchronize.

From the foregoing, it will be apparent, in our starting scheme, we provide over-excitation for the generator and a decreasing generator frequency—that is, a slowing down of the rotating flux in the motor stator at a time not only when the slip is extremely low, but at a time when the motor pole pieces hold just the right position in space with reference to the rotating flux in the stator to obtain the very maximum pull-in torque.

An instant after the motor field is thus excessively excited by the opening of contacts 6AD2 and the almost instantaneous synchronization of motor M has taken place, the back contacts 6AD1 open and the make contacts 6AD1 close. The opening of the back contacts 6AD1 deenergizes the time delay relay 1C and the closure of the make contacts 6AD1 re-energizes the coil for the governor relay GR to thus readmit the full amount of steam to thus speed up the generator to the normal operating speed.

The deenergization of relay 1C after a selected time interval opens contacts 1C1 and 1C2. The opening of contacts 1C1 merely inserts the current limiting resistor 132 in circuit with the actuating coils of the relays 4C, 5AD, and 6AD which relays remain energized during the remainder of the starting cycle and during normal operation thereafter.

The opening of contacts 1C2 interrupts the direct excitation circuit for the main field EMF of the exciter. This field is now again energized through the rheostat 111 and is thus subject to such variations as the rheostat may impose.

Since the synchronizing relay SR is, during this stage, deenergized, the contacts SR2 are again closed. A circuit is established from the positively energized conductor 115, the segment AH, the contact on the pilot house lever PHL, conductor 116, contact segments P1, conductor 117, contacts REb and R3, and the coil of the forward directional contactor F to the negative terminal. The drum D is thus again started so as to move successively to the fourth and fifth positions.

Since full speed ahead was assumed the lever or contact arm FL is also contacting segment P2. This means the high speed relay is energized by the same circuit hereinbefore explained. The drum D thus moves rapidly to the fourth position.

Just before this operation takes places, the relay 1C, being a time delay relay, will keep its contacts 1C2 closed for some two to three seconds after synchronization takes place so that over-excitation is retained for such period of two to three seconds after synchronization. After contacts 1C2 open and the drum D has moved to the fourth position the over-excitation circuit for field EMF is also broken at contacts D17.

In the fourth position of the drum D, a circuit is set up for the resynchronizing relay RS but since contact SR3 is open, relay RS is not energized. The utility of this arrangement will appear hereinafter.

In the fourth position, contacts D18 are closed to thus establish a circuit for the auxiliary field EAF independent of contacts 4C1. Contacts D18 are also closed to establish a circuit set up for utility with other operations.

Just prior to the time the drum D and the follow-up disc FU have followed to the speed setting made by lever PHL, the lever FL passes out of contact with segment P2. This deenergizes the high speed relay HR so that hunting of the pilot motor to the speed setting selected is prevented.

The pilot motor also operates the cam C3 for controlling the turbine speed through suitable reduction gears. The cam thus adjusts the governor GV to the speed setting selected by the lever PHL. In this connection, it should be understood that the positions four and five of the drum hereinbefore mentioned are to be understood merely as a speed range from positions four to five. The arm PHL may be positioned anywhere over about 120° to either side of the vertical position. When the lever PHL is positioned to either side of the vertical by 24°, the movement suffices to synchronize the motor and if the lever be retained in either of the two 24° positions, the motor will operate at about 20% of full speed. It is thus apparent that movement of lever PHL over the remainder of the range will bring the motor to full speed. For a group of ships where our control is being used, the remainder of the speed range in each case amounts to an additional 96° of arm movement.

When the motor arrives at the speed selected by the lever PHL, the segment P1 is deenergized since the follow-up mechanism FU has positioned the disc carrying segments P1 and P2, and P10 and P20 so that the gap between P1 and P10 and thus also the gap between P2 and P20 hold the same position in space as the position as lever FL which holds the same position as is held by the lever PHL in the pilot house. Deenergization of segment P1 deenergizes the pilot motor to thus stop the drum in the position selected.

If an increase of speed is desired, assuming the motor M does not operate at full speed, then the operator in the pilot house merely moves the lever counter-clockwise to a greater extent to thus again energize the segments P1 and the pilot motor M thus moving the drum to the new speed position. The movement of lever PHL may be slow to thus gingerly increase the speed should the exigencies of the situation so dictate. If slow movement is not required, the movement may be rapid in which case the high speed relay will also be energized from segment P2.

If the speed is to be decreased, the lever PHL is moved clockwise from the speed position it holds. Since the follow-up lever FL follows the movement of lever PHL immediately, the lever FL will make contact with segment P10 if the movement is slow and continuous, and will make contact with both segments P10 and P20 if the movement is rapid.

When segment P10 is thus energized by clockwise movement of lever PHL, while in some high speed position, the reverse directional contactor R is energized. The circuit for this contactor may be traced from the energized segment P10 through conductor 133, the back contacts RSa of the resynchronizing relay RS, the back contacts F3 of the forward directional contactor and the coil of the reverse directional contactor R. The motor will thus reverse the operation of the drum moving it toward the 20% speed position represented by the fourth forward position.

Energization of segment P20 under the condition assumed for reducing the speed does not energize the high speed relay because contacts D10 are not closed in any of the forward positions except the first. The ship moving through the water and subject to the water drag will ordinarily slow down as fast as desired even though the pilot motor operates at slow speed.

As the speed is varied not only is the voltage of the generator varied in accordance with the speed, but also the margin of electrical stability is correspondingly varied.

As the speed is increased, the rheostat setting of rheostat 111, which is also geared to the pilot motor, is changed so that the excitation of the exciter E and thus the excitation of both motor M and generator G is increased. Since the power requirements with increase in speed rise from the second to somewhere near the third power of the speed, depending on the speed, the margin of stability has to be widened with a rise in speed. This I accomplish with the regulator REG.

As the load current rises, the main control coil MCC of the regulator is energized more and more. This means that more and more resistor sections of resistor 107 are shunted by the field control spring contacts FC. The auxiliary field EAF thus provides the necessary margin of stability. The auxiliary coil AU shunted across resistor 113 in series with main field of the exciter, provides an anti-hunting field regulation.

If in spite of the stability control, operating conditions arise so as to pull the motor M out of step, then the synchronizing relay SR will again be energized and close the contacts SR3. Since the drum for the operating positions thus far discussed has contacts D12 closed, a circuit is established from the energized conductor 114, contacts SR3, conductor 122, contacts D12, conductor 123, and the coil of the resynchronizing relay RS to the negative terminal.

Operation of resynchronizing relay RS first opens the back contacts RSa and RSb and also opens contacts RS1. This operation deenergizes the directional contactors should either of them be at the moment energized. If neither directional contactor is energized, then the resynchronizing sequence is simplest, but since pull-out is more likely to occur when an increase in speed is attempted, let forward operation be assumed and let it be assumed the forward directional contactor F was thus, at the moment of pull-out, energized. Opening of the back contact RSb will deenergize the forward directional contactor F and the closing of the make contacts RSa will establish a circuit from the energized conductor 114, through contacts D13, conductor 134, the make contacts RSa, the back contacts F3 and the actuating coil of the reverse directional contactor R to the negative terminal.

Opening of contacts RS1, since these contacts are in series with the field circuits for both the fields of the exciter E, causes the exciter voltage to drop to thus remove excitation from both the generator field GF and the motor field. While the drum is thus being moved to the third position, the current surges between the generator and motor are eliminated while the motor is not in synchronism.

The drum is thus moved in the reverse direction until it holds the third forward position. In this position, the resynchronizing relay RS is first deenergized by the opening of contacts D12 and a moment later assuming the make contacts RSa are still closed the reversed directional contactor R is deenergized by the opening of contacts D13. Since the resynchronizing relay RS is deenergized in the third position, the contacts RS1 are again closed and resynchronization takes place in the same manner as during a normal starting cycle.

Since the contacts SR2 of the synchronizing relay are open and all other circuit arrangements are now the same as when the controller drum was first moved to its third position, the synchronizing cycle is automatically repeated.

Figure 2A:
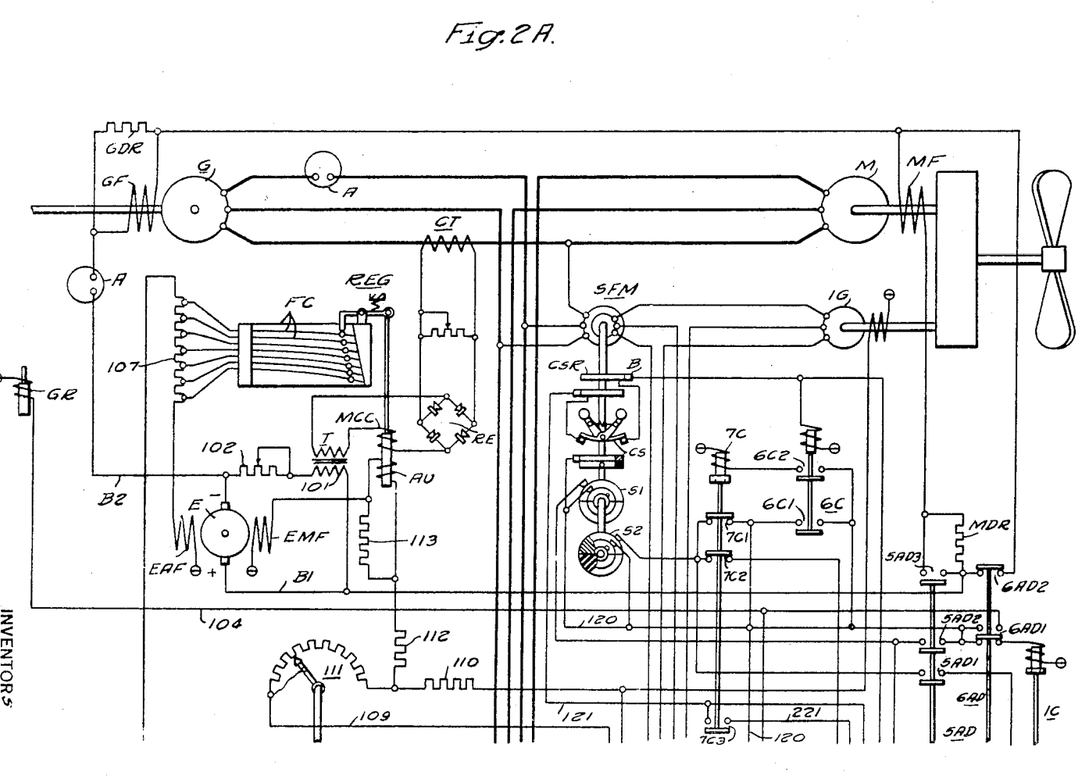
Figures 2A and 2B are a diagrammatic showing of a modification of our invention.
Figure 2B:
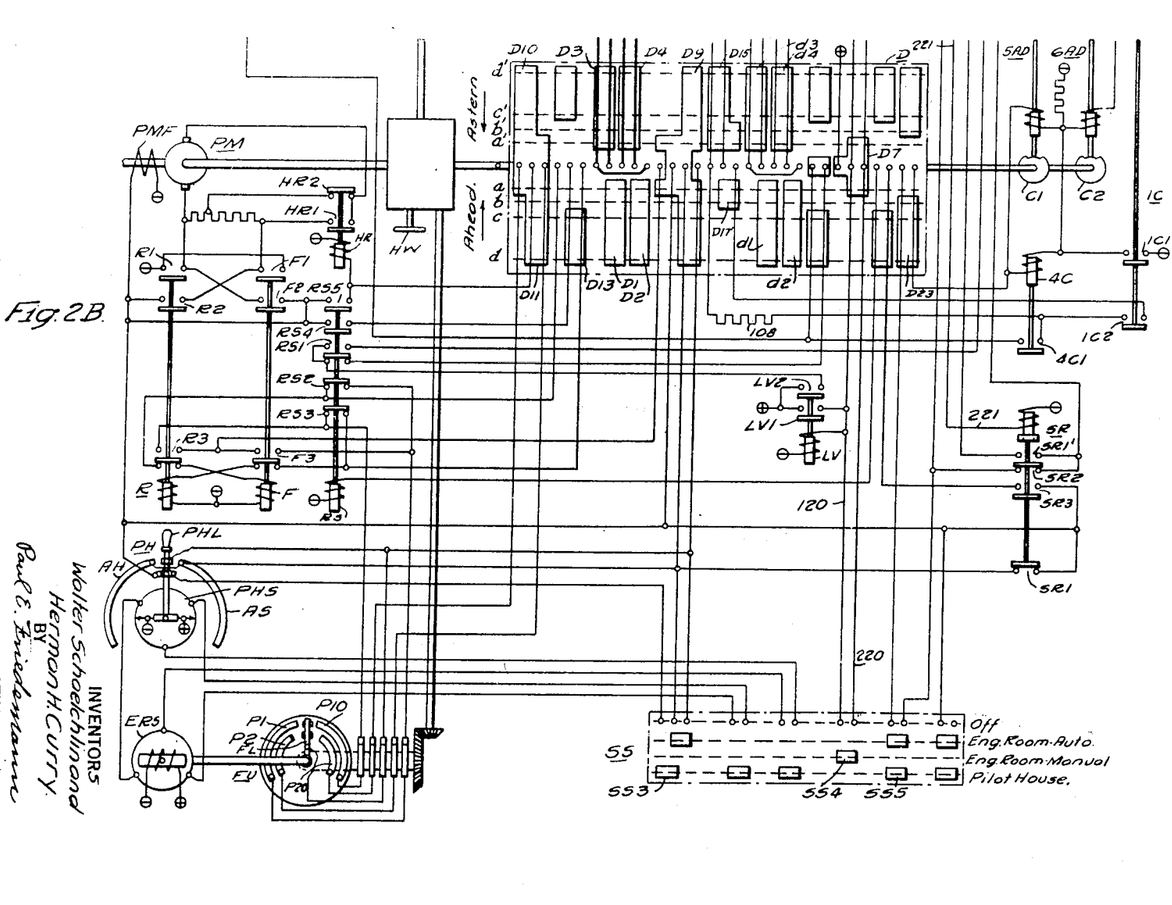

In the modification shown in Figures 2A and 2B, some refinements are shown. All the elements having the same construction and function are designated by the same reference characters, but the additions are designated by different reference characters.

To understand the showing in Figures 2A and 2B, it is not necessary to analyze a complete starting sequence, but the contributions may be readily understood from a fragmentary discussion.

Assuming that the drum D is being moved to the third position. The motor M will be accelerated as an induction motor and the slip frequency motor SFM will be operating at a relatively high speed. This means that the contacts of the centrifugal switch CS are closed. The instant these contacts close, a circuit is established from the energized conductor 129, through the contacts of the centrifugal switch CS, the slip ring CSR, the brush E and the coil of relay 6C to the negative terminal. Relay 6C picks up without time delay closing the contacts 6C1 and 6C2.

Closure of contacts 6C2 establishes a circuit from the energized conductor 129 through contacts 6C2 and the actuating coil of time limit relay 7C to the negative terminal. This relay has a four to five seconds time limit only during dropout, but when its coil is energized will be operated immediately to open its contacts 7C1 and 7C2. Opening of contacts 7C1 opens the shunting circuit around contacts S2 and the opening of contacts 7C2 opens other shunting circuits for contacts of S2. When 7C is energized, the possibility of energizing the coil of control relay 6AD depends entirely on contacts 5AD1 and S2.

If normal synchronization takes place, control relay 5AD will become energized and hold itself in operated position in the normal manner.

In the modification shown in Fig. 2, the closure of contacts 5AD1 does not directly energize the control contactor 6AD, but the energization takes place through contacts 5AD1 and S2. The reason for adding contact S2 is to more accurately and with greater certainty control the energization of the motor field at a time to obtain maximum pull-in torque.

The disks S2 are similar in every respect to disks S1, but the angular position on the shaft of the slip frequency motor may be different. In short, the position is so chosen that maximum pull-in torque is obtained.

If, for any reason, sychronization does not take place normally and the slip frequency remains above the dropout value of the synchronizing relay SR, then as soon as the contacts of the centrifugal switch CS open relay 6C is deenergized. This de-energizes the time limit relay 7C which, after the lapse of four to five seconds, closes its contacts 7C1 and 7C2 to thus establish a circuit from conductor 120 through contacts 7C1 and 7C2, contacts SS5, contacts D23 to the coil of control relay 5AD.

When the contacts 5AD1 are closed, a circuit is established from conductor 120 through contacts 7C1 and 5AD1 to the coil of field control relay 6AD. From this sequence of operation it will be apparent that the motor is synchronized regardless of the position of commutating disks S1 and S2. True, the advantages of maximum pull-in torque are not obtained, but synchronous operation, the most important operation, is obtained nevertheless.

In the event of pull-out for any cause whatsoever, the resynchronizing relay RS will again be energized. This proceeds in this manner: At pull-out the centrifugal switch CS contacts again close to thus, in sequence, energize relays 6C and 7C. As 7C is energized, its contacts 7C3 are closed whereupon a circuit is established from conductor 120 through the contacts of the centrifugal switch CS, conductor 121, contacts 7C3, conductor 221, and the coil of the synchronizing relay SR to the negative terminal.

Operation of the synchronizing relay SR closes the contacts SR3 to thus energize the resynchronizing relay RS. The resynchronizing relay opens back contacts RS1 to thus remove all excitation from the exciter E. The generator G and motor M are thus without excitation while the drum is being moved to the third position.

While the generator is thus unexcited, it may, on some occasions, happen that the speed relation of the generator with reference to the motor becomes such that the contacts of the centrifugal switch CS open before the drum D is in the third position, at which time conditions for synchronization are correct. When this happens, relay 6C might become prematurely de-energized. To prevent this, we provide make contacts RS1 on the resynchronizing relay RS in shunt relation to the contacts of the centrifugal switch CS. This shunting circuit remains closed until the resynchrozining relay RS is deenergized, when the drum D is in the third position.

In the modification shown in Figs. 1A and 1B, astern operation of the ship, that is, reverse operation of the motor, also reverses the direction of rotation of the rotating field in the slip frequency motor SFM. Since the pilot generator IG geared to the motor M operates in reverse direction, the rotating field in the rotor of the slip frequency motor is also reversed. The slip frequency motor SFM thus operates correctly as a function of the slip of motor M. The direction of rotation will, however, be reversed. This means that if the commutating disks are adjusted correctly on the shaft of the slip frequency motor to obtain angle switching with maximum pull-in torque for forward operation, the adjustment of the commutating disks may not be quite correct to obtain angle switching with maximum pull-in torque when the slip frequency motor operates in the reverse direction.

The electrical angle over which maximum pull-in torque is obtained is a fairly small angle. To make certain that the most advantageous region of this relatively small angle is obtained for either direction of rotation of the motor M, the simplest and cheapest and most reliable procedure is to provide for the same direction of rotation of the slip frequency motor, regardless of the direction of rotation of the main motor M. This we accomplish by providing for the same direction of rotation of the flux in the stator of the slip frequency motor SFM regardless of the direction of rotation of the main motor and by providing for the same direction of rotation of the flux in the rotor of the slip frequency motor SFM.

Contact segments $d1$ and $d2$ or contact segments $d3$ and $d4$, depending on the direction of rotation of the main motor, so interconnect the pilot generator IG and the rotor of the slip frequency motor SFM that the direction of rotating flux is always the same in the rotor of the slip frequency motor, regardless of the direction of rotation of the main motor M. On the other hand, the stator of the slip frequency motor SFM is permanently connected to the generator so that the rotating flux in the stator of the slip frequency also remains in the same direction.

The drum D is electrically symmetrical in every respect, except one, presently to be discussed, for both the ahead and astern directions. A detailed discussion of astern operation would thus add no great deal to an understanding of our system of control. Such discussion would involve mainly a repetition of all the operations involving merely other electrically symmetrical segments on the drum D.

The control for the excitation is not the same in the reverse direction. Astern operation is usually on emergency operation that is not long continued. Further, during such emergency operation, it becomes doubly important that a strong field be maintained on the motor and generator. To obtain this strong field, we provide the contacts D15 for shunting the rheostat 111 for all speed positions for astern operation from the third, or synchronizing position, (Fig. 1B) to the full speed position. Generally, the same conditions obtain for the modification shown in Fig. 2B except that the rheostat is shunted from the second drum position to the full speed position.

It will also be noted that contacts D17' in Fig. 2B are also not quite the same as contacts D17 in Fig. 1B. Since the drum D moves rather rapidly from the first, or "off", position, to the third, or synchronizing, position, it may be desirable to make certain the fields of the exciter E and the generator G are fully built up to an over-excitation by the time the drum D arrives to the third position. To this end, the rheostat 111 is shunted for both the second and third drum positions, and for both the ahead and astern directions.

It will be noted that the selector switch SS has positions, namely, "off," "engine room automatic," "engine room manual," and "pilot house." Pilot house control has heretofore been discussed. If the selector switch SS is moved to Engine room manual control, it will be noticed that the only contacts closed are contacts SS4. This means conductor 220 is energized at all times regardless of the position of the drum D. Neither the follow up, the synchrotie nor the pilot motor will be energized since all the other switches of the selector switch SS are open. The handwheel HW is then moved until the drum is in the third or start position. Switches D1, D2, $d1$ and $d2$ or D3, D4, $d3$ and $d4$ will thus be operated depending on the direction of operation of the drum and the governor relay GR is energized.

When the ammeters A show conditions for synchronization are ripe, the handwheel HW is moved to synchronizing position. In the synchronizing position, the control cams C1 and C2 are operated in the requisite order to synchronize the motor M.

If the selector switch SS is in the second or Engine room automatic position, the starting proceeds almost in the same manner as through pilot house control, except that the lever FL, instead of being operated by the synchrotie ERS, is operated directly from a knob on lever FL. The synchrotie is deenergized during this operation so as not to interfere with the operation from the knob.

While we have shown and described two modifications only, we do not wish to be limited to the particular showing made but wish to be limited only by the scope of the claims hereto appended.

We claim as our invention:

1. In a ship propulsion system having a turbine, an alternating current generator driven by the turbine having conventional armature and field windings, a synchronous motor having conventional damper windings, alternating current primary windings and field windings, the combination of, a speed control lever in the pilot house, a follow-up lever in the engine room, electric synchronizing means for causing the follow-up lever in the engine room to follow the movements of the pilot house control lever, a pilot motor controlled by the follow-up lever, a starting sequence control drum for the synchronous motor coupled to be driven by the pilot motor, means responsive to a predetermined operation of the drum to increase the speed of the generator and to connect the synchronous motor to the generator to effect automatic acceleration of the synchronous motor as an induction motor, means responsive to a selected slip speed of the synchronous motor for automatically decreasing the generator speed and means responsive to the motor load current for increasing the generator excitation, and means responsive to a selected position of the pole pieces of the synchronous motor to the rotating flux in the motor for automatically exciting the field windings of the synchronous motor so as to synchronize the synchronous motor with maximum pull-in torque, and means operable upon synchronization of the synchronous motor for effecting movement of the starting sequence control drum to the speed position selected by the pilot house lever.

2. In a ship propulsion system having a turbine, an alternating current generator, provided with conventional armature and field windings, coupled to the turbine to be driven thereby, a synchronous motor also provided with conventional windings as armature windings, damper windings, and field windings, the combination of control devices comprising: a pilot house lever, an engine room lever, two interconnected electric synchronizing units mechanically coupled respectively, to the two levers so that any movement of the pilot house lever causes a corresponding movement of the engine room lever, means set in operation by a predetermined movement of the engine room lever for automatically synchronizing the synchronous motor with maximum pull-in torque, means operable a predetermined time interval after the engine room lever is moved to said predetermined position for automatically synchronizing said synchronous motor should said automatic synchronization with maximum pull-in torque not have taken place before the expiration of said predetermined time interval, and means responsive to additional movement of said engine room lever greater than said predetermined movement for controlling the frequency of said alternator in proportion to the additional movement of said engine room lever as it follows the movement of the pilot house lever, whereby complete pilot house control is obtained for the ship from the pilot house.

3. In a ship propulsion system having a turbine, an alternating current generator, provided with conventional armature and field windings, coupled to the turbine to be driven thereby, a synchronous motor also provided with conventional windings as armature windings, damper windings, and field windings, the combination of control devices comprising: a pilot house lever, means responsive to a predetermined movement of the pilot house lever for connecting the synchronous motor to the alternator and for increasing the speed of the alternator so as to automatically effect acceleration of the synchronous motor operating as an induction motor to its minimum slip speed, an engine room lever, two interconnected electric synchronizing units mechanically coupled respectively, to the two levers so that any movement of the pilot house lever causes a corresponding movement of the engine room lever, means set in operation by a predetermined movement of the engine room lever for automatically synchronizing the synchronous motor with maximum pull-in torque, means responsive to a slip speed of the synchronous motor slightly greater than the minimum slip speed for automatically over-exciting the alternator and for decreasing the alternator frequency, and means responsive to said minimum slip speed for automatically over-exciting the synchronous motor at an instant when the pole pieces of the synchronous motor hold just such position with reference to the rotating field in the primary, or armature, winding of the synchronous motor to obtain maximum pull-in torque at synchronization of the synchronous motor means operable a predetermined time interval after the engine room lever is moved to said predetermined position for automatically synchronizing said synchronous motor should said automatic synchronization with maximum pull-in torque not have taken place before the expiration of said predetermined time interval, and means responsive to additional movement of said engine room lever greater than said predetermined movement for controlling the frequency of said alternator in proportion to the additional movement of said engine room lever as it follows the movement of the pilot house lever, whereby complete pilot house control is obtained for the ship from the pilot house.

4. In a ship propulsion system having a turbine, an alternating current generator, provided with conventional armature and field windings, coupled to the turbine to be driven thereby, a synchronous motor also provided with conventional windings as armature windings, damper windings, and field windings, the combination of control devices comprising: a pilot house lever, an engine room lever, two interconnected electric synchronizing units mechanically coupled respectively, to the two levers so that any movement of the pilot house lever causes a corresponding movement of the engine room lever, means set in operation by a predetermined movement of the engine room lever for automatically synchronizing the synchronous motor with maximum pull-in torque, means operable a predetermined time interval after the engine room lever is moved to said predetermined position for automatically synchronizing said synchronous motor should said automatic synchronization with maximum pull-in torque not have taken place before the expiration of said predetermined time interval, and means responsive to additional movement of said engine room lever greater than said predetermined movement for controlling the frequency of said alternator in proportion to the additional movement of said engine room lever as it follows the movement of the pilot house lever, whereby complete pilot house control is obtained for the ship from the pilot house.

WALTER SCHAELCHLIN.
HERMAN H. CURRY.

REFERENCES CITED

The following references are of record in the file of this patent:

UNITED STATES PATENTS

| Number | Name | Date |
| --- | --- | --- |
| 1,830,613 | Matson | Nov. 3, 1931 |